Dec. 3, 1957  BENNY NARN CHEW  2,814,912
METHOD AND APPARATUS FOR THE PRODUCTION OF BEAN SPROUTS
Filed Dec. 13, 1955  2 Sheets-Sheet 2

INVENTOR
*Benny N. Chew*

BY *Stevens, Davis, Miller and Mosher*
ATTORNEYS

United States Patent Office 2,814,912
Patented Dec. 3, 1957

2,814,912

METHOD AND APPARATUS FOR THE PRODUCTION OF BEAN SPROUTS

Benny Nam Chew, Washington, D. C.

Application December 13, 1955, Serial No. 552,943

3 Claims. (Cl. 47—58)

This invention relates to a method of producing seed sprouts and has particular reference to the sprouting of mung beans (*Phaseolus aureus*), or soy beans, and to an automatic device adapted to produce especially large and plump hypocotyls with a minimum of root growth.

Sprouted legumes are one of the most important ingredients in the so-called Chinese dishes in America, and constitute one of the chief fresh vegetable ingredients in the diet of oriental populations. Mung beans, native to Manchuria, are now being imported into the United States in considerable quantities from Mexico, Central America and Cuba. By sprouting, the difficultly digestible beans are converted into a palatable and easily digested food. It is known that such sprouted legumes are high in protein, rich in vitamin C and relatively low in carbohydrates.

In the past, the sprouting of beans has been carried out on a small scale by individuals who produce only a sufficient quantity for their own use. The general procedure has been to pour warm water over the beans every four hours for approximately three days, when the beans started to sprout. The time of sprouting has been largely dependent upon the temperature of the weather and was carried out indoors. The manual application of water has been subject to error, and attempts have previously been made to mechanically control the temperature of the water applied to the beans during the sprouting period.

An object of my invention is a new apparatus for sprouting soya beans, mung beans, and the like which will automatically control the temperature of the water, the quantity of water applied, and the time interval between applications. Still another object of my invention is to provide a new method of sprouting beans which will suppress the strong "beany" flavor, minimize root formation, decrease the sprouting time, and increase the yield of bean sprouts obtained.

I have found that an improved product may be obtained by applying at timed intervals varying quantities of water in a controlled amount and at a controlled temperature during the sprouting period.

Figure 1:
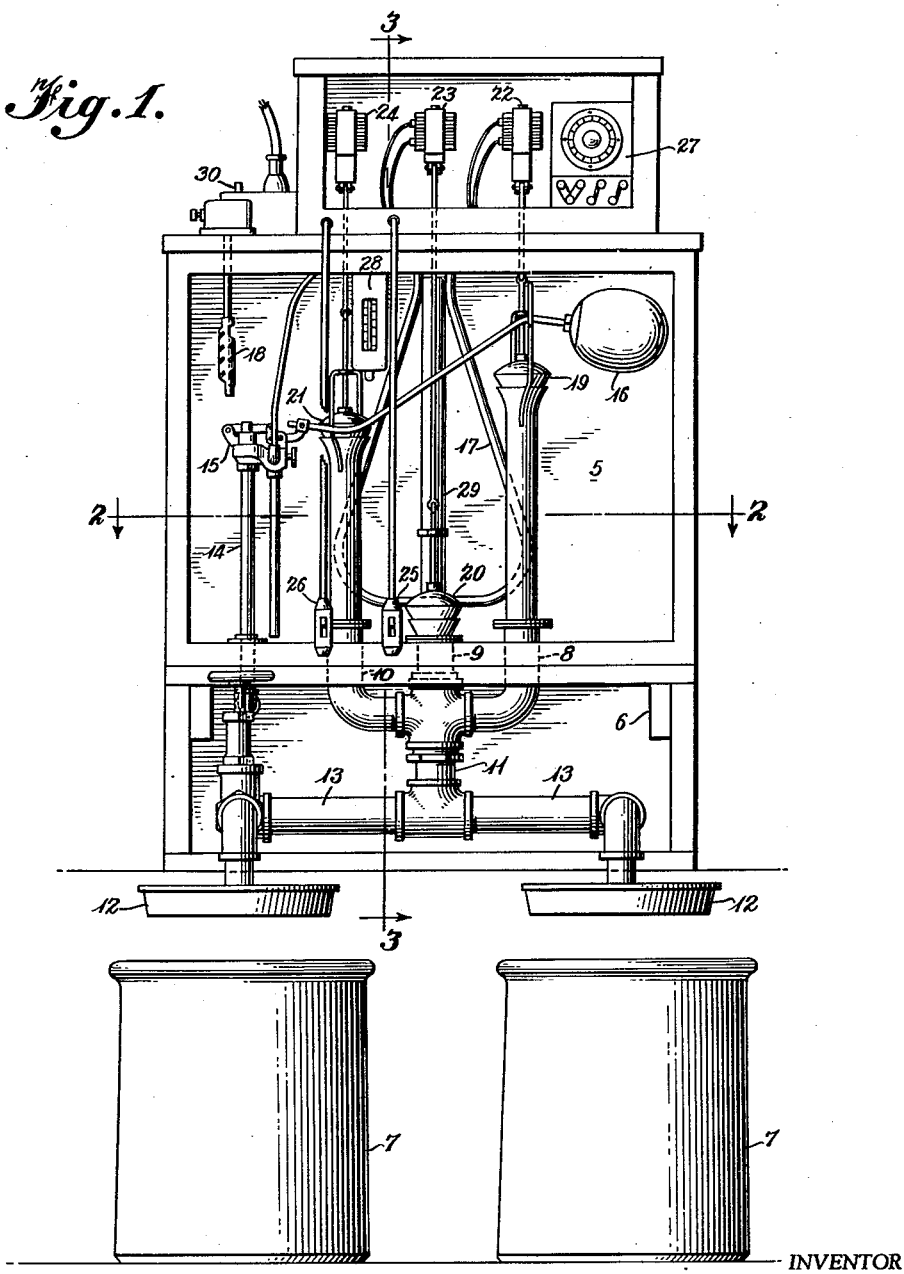
Figure 2:
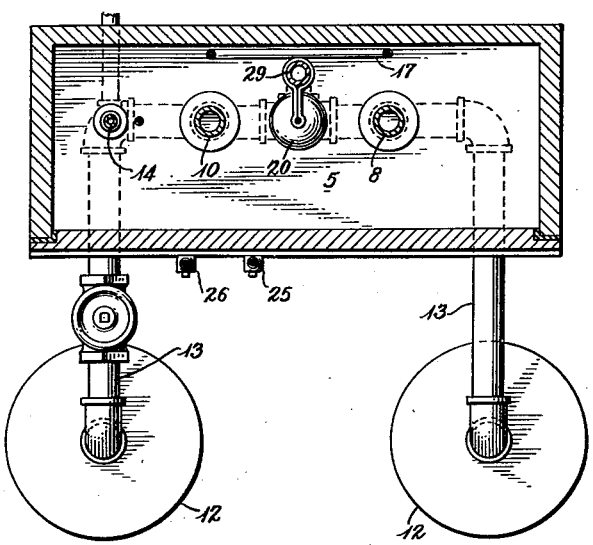
Figure 3:
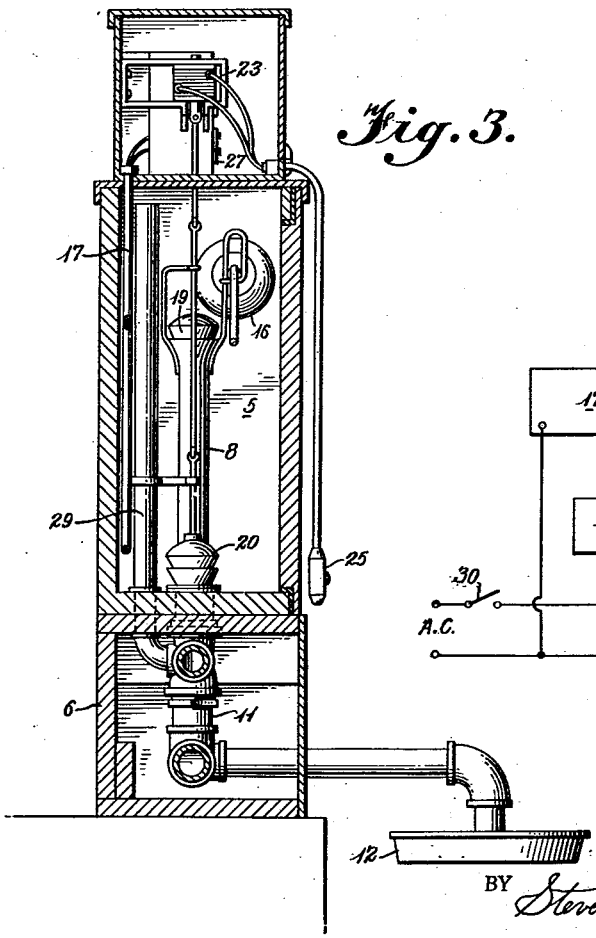
Figure 4:
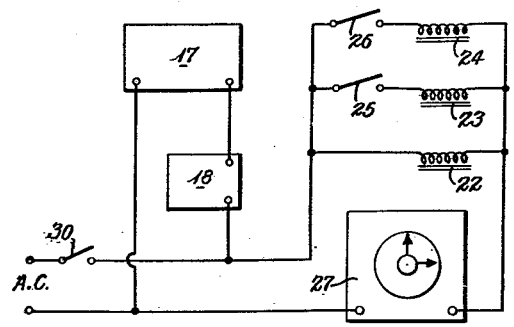

My invention may be illustrated by the accompanying drawings in which Figure 1 is a front elevation showing the interior of the apparatus for controlling the application of water, Figure 2 is a sectional view taken along the line 2—2 of Figure 1, and Figure 3 is a side elevation in section taken along the line 3—3 of Figure 1. Figure 4 is a schematic circuit diagram of the timing and temperature controls.

The invention will appear more clearly from the following detailed description when taken in connection with the accompanying drawings, showing by way of example a preferred embodiment of the inventive idea.

Referring to Figure 1 of the drawings, it will be seen that a water reservoir 5 is supported upon a stand 6 above dual ceramic containers 7 which hold the beans to be sprouted. Three conduits 8, 9 and 10 pass through the bottom of the reservoir 5 and are adjoined by a proper fitting to the common drain 11. A pipe T at the end of conduit 11 divides the effluent stream into two equal portions and distributes it to the spray heads 12 through conduits 13.

Water from an outside source is admitted to the reservoir 5 by pipe 14 and valve mechanism 15 operated by float 16. The float 16 and valve 15 cooperate to maintain the water level in the reservoir at a constant height determined by the float setting. In the specific example now described the water reservoir has a capacity slightly in excess of twenty gallons, and the float 16 is adjusted to close valve 15 when twenty gallons of water have entered the tank.

A thermometer 28 extends into the reservoir 5 and indicates the temperature of the water at all times. The temperature of the water within the tank is controlled by the electric immersion heater 17 and thermostat 18. The connection of the thermostat and heater to a source of current is illustrated by Figure 4.

The escape of water from the reservoir 5 is controlled by the ball valves 19, 20 and 21 operated by solenoids 22, 23 and 24. The relation of the switches 25 and 26 to the solenoids 23 and 24 is depicted in Figure 4. Figure 4 also illustrates the timing mechanism 27 which is positioned on top of the water reservoir and controls solenoids 22, 23 and 24. The bottom of standpipe 29, which functions as an overflow pipe, is connected to pipe 11 at its base.

In the operation of my device, water from public service supply enters through pipe 14 and fills the hot water reservoir 5. When the reservoir has been filled to the 20-gallon level, the float 16 closes valve 15 and acts to maintain that level. Inasmuch as the water supply is generally below the optimum temperature for sprouting beans, the heater 17 is turned on by switch 30 and warms the water to a temperature determined by the setting of thermostat 18. I have found that 75° F. is the optimum temperature for sprouting beans by the method herein described. If the temperature of the water is maintained over 80° F. the development of root growth increases. Temperatures below 75° F. delay sprouting.

Using the apparatus described, of 20-gallon capacity, the containers 7 may conveniently be 10-gallon ceramic jars perforated at the bottom with holes to permit rapid drainage of water. Into each of the 10-gallon crocks is placed approximately six pounds of dried beans.

The timing mechanism 27 is then set, energizing the solenoid 22 at four-hour intervals. This solenoid, when energized, raises valve 19 and partially drains the reservoir through pipe 8 into the crocks 7. The top of the pipe 8 is positioned within the reservoir at a level which will permit five gallons of water to be equally distributed over the beans in both crocks. The solenoid 22 is energized for a time only sufficient to permit drainage of the reservoir. The timer 27 then breaks the circuit to the solenoid 22, permitting valve 19 to close again, and cold water enters the reservoir through pipe 14 and valve 15 until the reservoir once more contains twenty gallons of water, at which time the valve 15 is closed by float 16. The immersion heater 17 increases the temperature of the fresh inflowing water to 75° F. and maintains that temperature as indicated by thermometer 28, thus the apparatus functions to sprinkle the beans in each of the ten-gallon crocks with 2½ gallons of water heated to 75° F. at four-hour intervals.

At the end of the first day, or twenty-four hours after the first treatment of the beans with warm water, the switch 26 is moved to a position which places solenoid 24 in the timing circuit. Thereafter the timer 27 energizes solenoid 24 at four-hour intervals and operates valve 21. Inasmuch as the top of pipe 10 is at a level in the reservoir which will permit 10 gallons to drain into the two crocks, the sprouting beans are now treated with ten gallons of water at 75° F. at four-hour intervals. Of this ten gallons, five gallons is directed to each of the two crocks.

At the end of the second day, the switch 25 is moved to a position which connects the solenoid 23 with the timing mechanism 27. Under these circumstances the solenoid 23, being energized at four-hour intervals, operates valve 20 to drain the entire twenty gallons from the reservoir. Thus, during the third day of the sprouting process each of the two crocks receives ten gallons of water at 75° F. every four hours.

It will be understood that the timer 27 serves to energize the solenoid circuit for a period of about one minute at four-hour intervals. This time is sufficient to completely drain the reservoir and at the end of the one-minute period, when the timer breaks the circuit, the ball valves return to their original position by gravity. The capacity of the heating element 17 is more than ample to completely heat twenty gallons of cold water to a temperature of 75° F. during the four-hour intervals between the draining operation.

Thus, it will be seen that I have provided a simple apparatus which automatically discharges a controlled amount of water at a pre-selected temperature. It is an advantage of my apparatus that the quantity of water delivered can be varied from day to day in accordance with the state of development of the sprouting seeds. This is an important advantage, inasmuch as beans require an increasing amount of water during their sprouting period in order to mature at the earliest possible time and give maximum yield. By my process and using the apparatus described above, I am able to completely sprout beans without any spoilage in a period of three days. It is an advantage of my process that I obtain little root growth and excellent yield.

Using the apparatus as described, having a total water capacity of twenty gallons and treating six pounds of beans in each of the ten-gallon containers, I obtain at the end of three days more than eighty pounds of bean sprouts. When bean sprouts are raised by the well known manual process the yield of bean sprouts from six pounds of beans does not exceed thirty-five pounds. In addition, a longer time is required to mature the bean sprouts by the manual process; from four to five days.

It will be appreciated that the specific apparatus described in my preferred example can be enlarged to supply an increased number of sprouting containers and increase production.

What I claim is:

1. A bean sprouting machine comprising a water reservoir, a float-operated valve functioning to admit water into the reservoir to a predetermined height, a heating element positioned to heat the water within said reservoir, a thermostat immersed in the water and cooperating with said heater to maintain the water temperature constant at about 75° F., a plurality of water outlets extending from different levels within the reservoir, to a common sprinkler means delivering to beans in a receptacle therebelow, each outlet being fitted with a solenoid operative valve and timing means cooperating with said solenoid valves whereby varied quantities of water at about 75° F. can be furnished to a growing chamber at controlled intervals.

2. A bean sprouting machine comprising a water reservoir, a float-operated valve functioning to maintain water in said reservoir at a predetermined level, a heating element positioned to heat the water within said reservoir, a thermostat immersed in the water and cooperating with said heater to maintain the water temperature constant at about 75° F., two conduits passing through the bottom of said reservoir and extending upwardly within the reservoir to different levels below said predetermined level, an outlet at the bottom of the reservoir to a sprinkler delivering to beans in a receptacle therebelow, solenoid operating valves positioned to seal the outlet and both conduits; and timing means cooperating with said solenoid valves whereby varied quantities of water at about 75° F. can be furnished to a growing chamber at controlled intervals.

3. The method of growing bean sprouts which consists of sprinkling beans at controlled time intervals with a predetermined volume of continuously downwardly flowing water maintained at 75 to 80° F. during a three-day period, said volume of water being doubled at the end of twenty-four hours and again doubled at the end of forty-eight hours.

References Cited in the file of this patent
UNITED STATES PATENTS

| | | |
|---|---|---|
| 1,222,648 | Marks | Apr. 17, 1917 |
| 2,051,094 | Loughridge | Aug. 18, 1936 |
| 2,131,743 | Loughridge | Oct. 4, 1938 |
| 2,198,150 | Barnhart | Apr. 23, 1940 |
| 2,296,849 | Hammerstrom | Sept. 29, 1942 |
| 2,750,713 | Chin | June 19, 1956 |